US008375711B2

(12) United States Patent
Solomon et al.

(10) Patent No.: US 8,375,711 B2
(45) Date of Patent: Feb. 19, 2013

(54) COMPACT VACUUM MATERIAL HANDLER

(75) Inventors: William J. Solomon, Tulsa, OK (US); Darrell Hocutt, Tulsa, OK (US)

(73) Assignee: Vaculift, Inc., Tulsa, OK (US)

( * ) Notice: Subject to any disclaimer, the term of this patent is extended or adjusted under 35 U.S.C. 154(b) by 1002 days.

(21) Appl. No.: 12/355,843

(22) Filed: Jan. 19, 2009

(65) Prior Publication Data

US 2010/0183415 A1 Jul. 22, 2010

(51) Int. Cl.
*F16D 31/02* (2006.01)

(52) U.S. Cl. ........................................... 60/456; 60/486

(58) Field of Classification Search .................... 60/456, 60/486; 92/144

See application file for complete search history.

(56) References Cited

U.S. PATENT DOCUMENTS

| | | | | |
|---|---|---|---|---|
| 2,982,093 | A | 5/1961 | Belcher et al. | |
| 3,780,507 | A | 12/1973 | Chapman | |
| 4,218,885 | A * | 8/1980 | White | 60/456 |
| 4,474,713 | A | 10/1984 | Wickoren | |
| 4,517,466 | A | 5/1985 | Ogawa | |
| 4,555,825 | A * | 12/1985 | Van Raaij | 60/456 |
| 4,662,321 | A | 5/1987 | Devaux | |
| 5,085,468 | A * | 2/1992 | Billotte | 60/456 |
| 5,228,239 | A | 7/1993 | Heo | |
| 5,809,779 | A * | 9/1998 | Bruso | 60/486 |
| 6,378,303 | B1 * | 4/2002 | Higuchi et al. | 60/468 |
| 6,572,323 | B2 | 6/2003 | Schupback | |
| 7,389,641 | B2 | 6/2008 | Ruppert | |

* cited by examiner

*Primary Examiner* — F. Daniel Lopez
(74) *Attorney, Agent, or Firm* — Gable Gotwals

(57) ABSTRACT

An improved vacuum material handler having an onboard drive engine powering a vacuum pump and a hydraulic pump. The vacuum material handler also having a frame with integrated forklift lugs.

11 Claims, 10 Drawing Sheets

COMPACT VACUUM MATERIAL HANDLER

FIELD OF THE INVENTION

The present invention relates generally to a vacuum powered material handler. More particularly, the present invention relates to an improved compact vacuum handler used for moving pipe, flat stock, steel and other large and relatively heavy items having a smooth uniform surface.

BACKGROUND OF THE INVENTION

Vacuum material handlers are pieces of equipment which can be mounted on the boom of an excavator, overhead crane or other equipment to move large and heavy objects. They are most commonly found in pipeline construction and certain manufacturing facilities where they are used to move large diameter pipe or flat stock steel. The vacuum material handlers available on the market today typically have a frame with a hydraulically powered rotator which can be coupled to the boom of an excavator. The high pressure hydraulic fluid from the excavator is used to operate the rotator and rotate the material being moved.

The frame carries an internal combustion engine upon which can be either gasoline or diesel powered. This engine drives a vacuum pump. The vacuum pump is in fluid communication with a vacuum reservoir. The vacuum reservoir is in fluid communication with a large suction cup structure located beneath the frame typically called the pad. The pad is slightly contoured to be complimentary to the surface of the object being moved such that the pad would be slightly concaved to compliment the curve of the pipe being moved. Likewise the pad could be relatively flat to match up to the surface of plate metal being moved.

The prior art vacuum material handlers have been somewhat limited in applications to being used only on the equipment having a supply of hydraulic fluid. They are also not readily moved from one piece of equipment to another with the material held in place, i.e. it has not heretofore not been possible to pick up a pipe with the material handler on a excavator and then transfer the material handler with the pipe still attached to a second piece of equipment such as a forklift or overhead crane.

These limitation arises for two primary reasons. First the prior art material handler requires the high pressure hydraulic fluid from the excavator in order to rotate. Second there is not an apparatus by which the material handler can be moved from a first piece of equipment to a second piece of equipment while maintaining hold on the pipe or other material.

BRIEF SUMMARY OF THE INVENTION

The present invention is an improved compact vacuum material handler having a frame with an onboard engine driving an onboard vacuum pump and onboard hydraulic pump. The hydraulic pump powers the rotator. The frame also has a pair of integrated fork lift lugs located in the frame.

The present invention provides a compact vacuum material handler unit which can be coupled to various pads to move pipe and other large bulky material. The present design provides the advantage of being able to be moved from a first piece of equipment such as an excavator or overhead crane to a second piece of equipment such as a fork lift while maintaining a grip on a pipe or other material. This is possible due to the vacuum material handler not being dependent upon the hydraulic power supply from the excavator to operate the rotator or vacuum pump.

By coupling the output shaft of the drive engine to the input shaft of the vacuum pump and then having an output shaft on the vacuum pump which in turn is coupled to the input shaft on the hydraulic pump provides the ability to mount and power both the vacuum pressure and the hydraulic power with the same engine onboard the frame of the vacuum handler. This design also eliminates additional cost, weight and size needed to use a transmission or torque divider to split power from an engine to power to two devices such as vacuum pump and hydraulic pump. If size and weight are not a critical factor, the present device can be fabricated using transmission to split power from a drive engine and power both an onboard vacuum pump and an onboard hydraulic pump.

Additional embodiments of the present invention include a material handler having a frame with integrated forklift lugs and an onboard vacuum pump and rotator powered by a hydraulic fluid supplied by the equipment upon which it is mounted.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
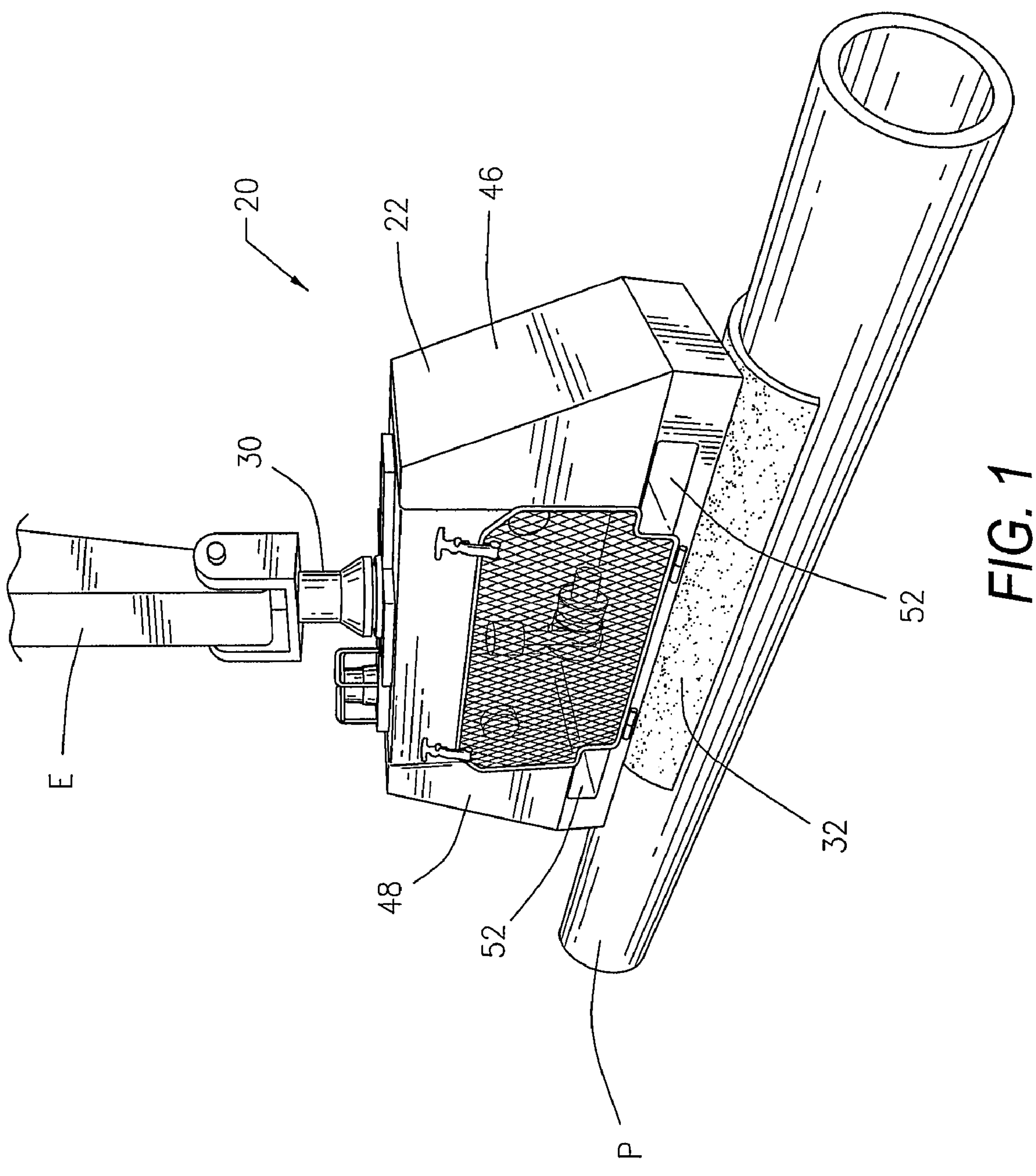
FIG. 1 is a perspective view of one embodiment of the present invention mounted on an excavator E with a pad holding a pipe P.

Turning now to FIGS. 1 through 6, the compact vacuum material handler of the present invention 20 has a frame 22, onboard drive engine 24, onboard vacuum pump 26, onboard hydraulic pump 28, rotator 30 and pads 32. When in use the vacuum material handler 20 can be coupled to an excavator, boom, backhoe or other equipment E by connecting it to the rotator 30. The material handler 20 can also be used in connection with a crane or other hoist by replacing the rotator 30 with a pick eye (not shown). When the material handler 20 is mounted to a excavator or other equipment E it can be used to pick up sheet metal, pipe P or other large items with a relatively smooth and uniform surface. The operator of the excavator lowers the vacuum handler 20 until the pads 32 come into contact with the pipe P or other material to be lifted.

Once the pads 32 are in contact with the pipe P the vacuum solenoid 18 opens placing the pads in fluid communication with the vacuum reservoir 54 and the vacuum pump 26. This creates vacuum pressure in between the pad 32 and the pipe P to be lifted. Once this pressure has been built the excavator E can then lift the pipe P using the material handler 20. The orientation of the pipe P about the end of the excavator E can be adjusted through manipulation of the rotator 30.

Figure 2:
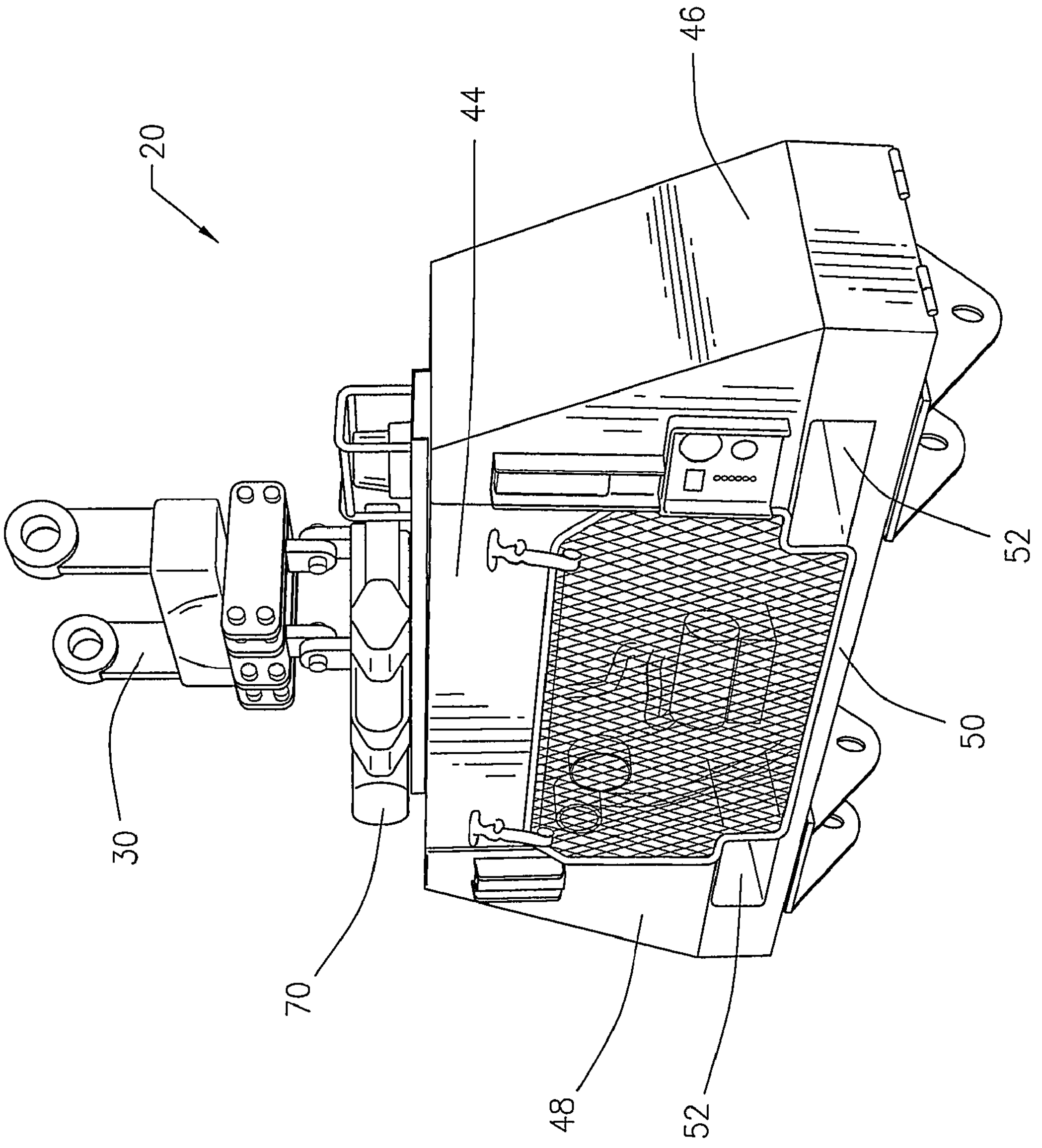
FIG. 2 is a perspective view of one embodiment of the vacuum material handler of the present invention.
Figure 3:
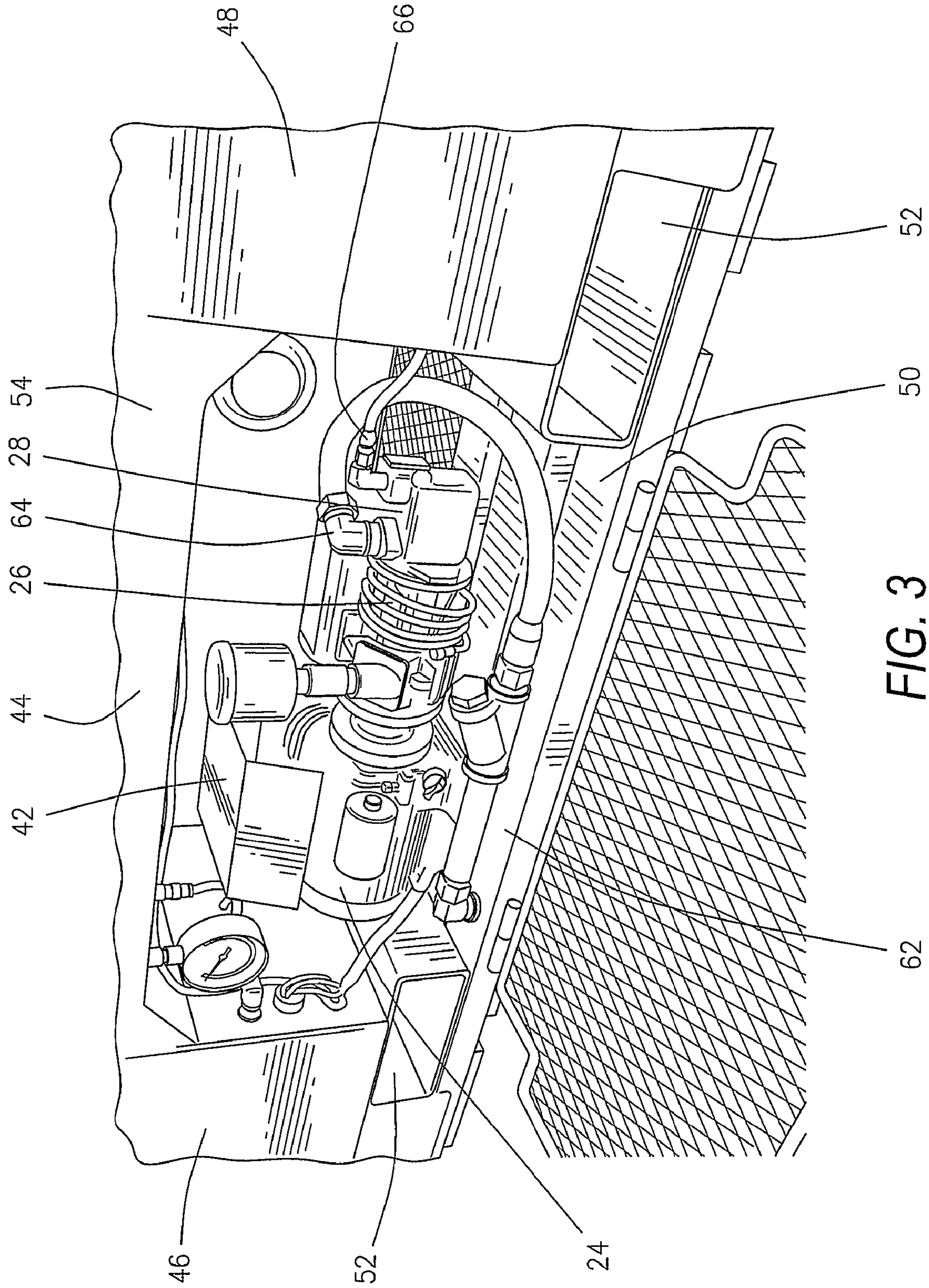
FIG. 3 is a view of the onboard drive engine, vacuum pump and hydraulic pump of the present invention.
Figure 5:
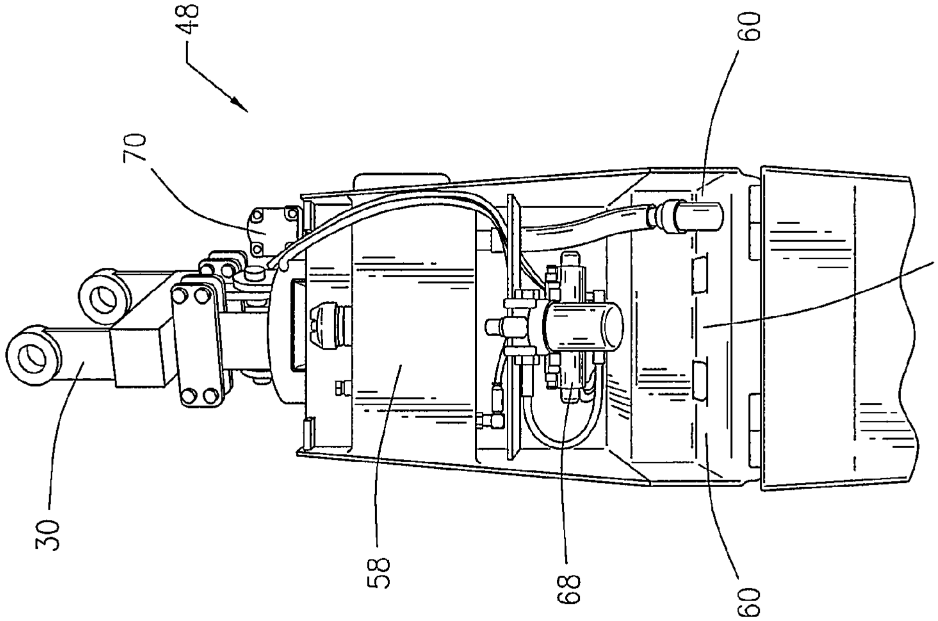
FIG. 5 is an interior view of the right side section of one embodiment of the present invention.
Figure 4:
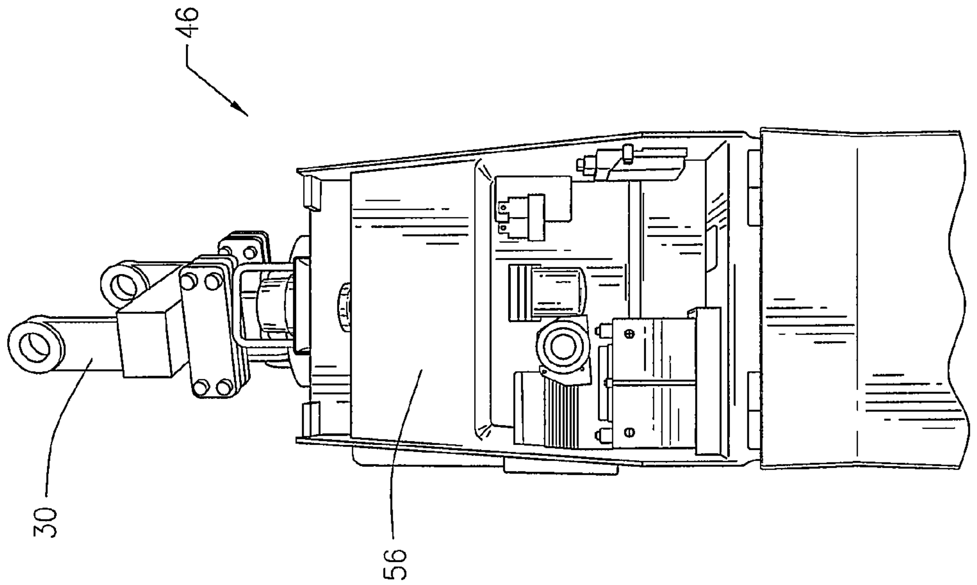
FIG. 4 is an interior view of the left side section of one embodiment of the present invention.
Figure 6:
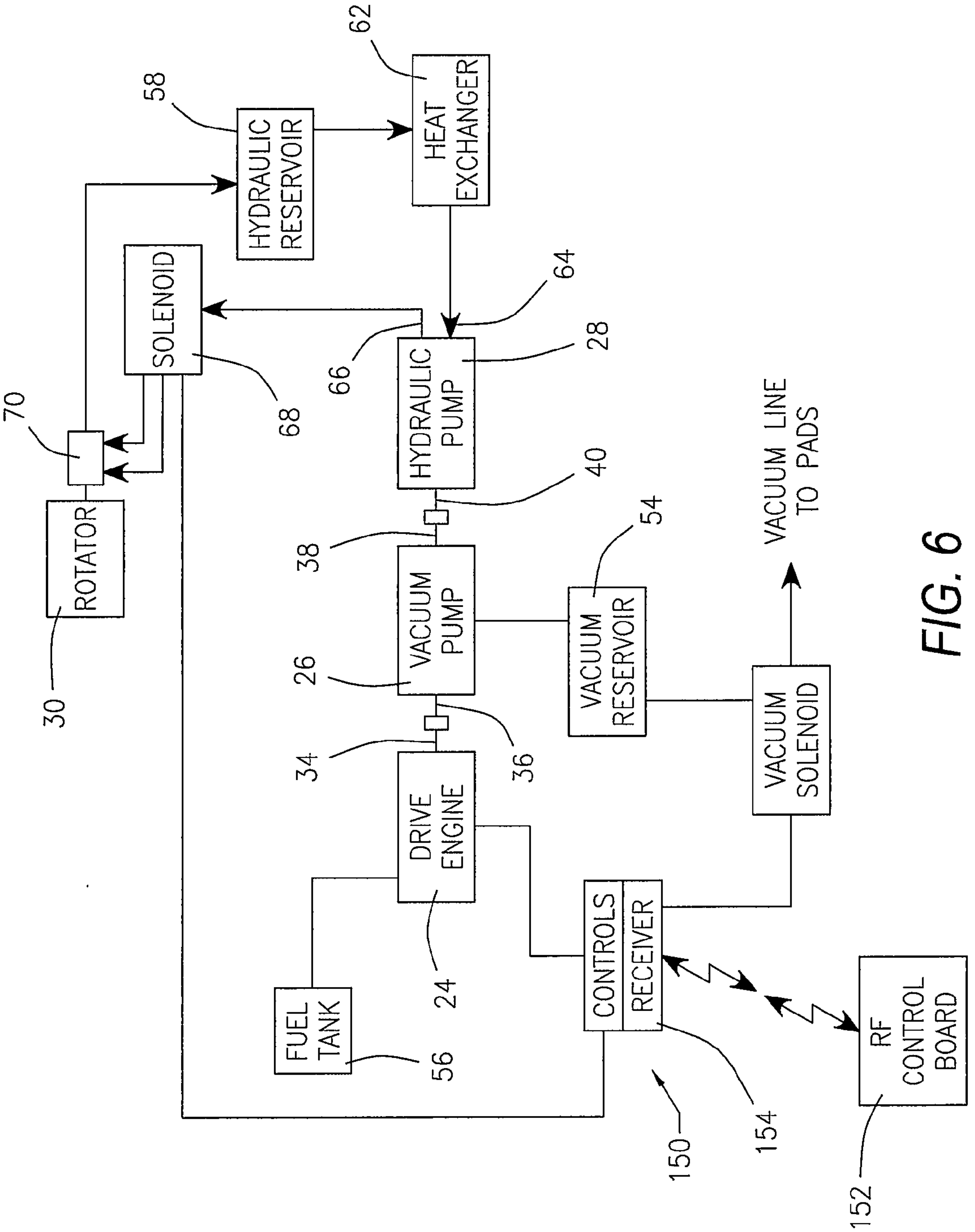
FIG. 6 is a schematic drawing of one embodiment of the present invention.

Turning now to FIGS. 2 and 6, it can be seen the vacuum material handler 20 of the present invention has an onboard drive engine 24 with an output shaft 34. The engine 24 is preferably gasoline or diesel powered, however other types of engines can be used. The output shaft 34 is coupled to the vacuum pump 26 input shaft 36. The vacuum pump 26 also has an output shaft 38 which is coupled to the input shaft 40 of the hydraulic pump 28. This arrangement allows for a single onboard drive engine 24 to operate both the vacuum pump 26 and hydraulic pump 28 without using a transmission or other torque splitter. This reduces fabrication costs as well as operational costs and the weight of the vacuum material handler 20.

When in use the vacuum pump 26 operates at extremely high temperatures. This contributes to the wear on the vacuum pump. The onboard drive engine 24 can be fitted with a duct 42 which directs air used to cool the engine 24 to also flow across the vacuum pump 26. Because the engine 24 typically runs at a cooler temperature than the vacuum pump 26. This air flow helps cool the vacuum pump 26.

The frame 22 has a top member 44, a pair of opposing side sections 46 and 48, a base section 50 and a pair of integrated forklift lugs 52. The frame 22 also contains a vacuum reservoir 54, a fuel tank 56 and a hydraulic fluid reservoir 58. The fork lift lugs 52 are a pair of passageways extending from the front side of the frame 22 to the back side of the frame 22. They are sized to fit the fork of most lift trucks and spaced around the center of gravity to provide a relatively balanced lift.

The exact location of the vacuum reservoir 54, fuel tank 56 and hydraulic fluid reservoir 58 can vary depending upon design requirements, however in the preferred embodiment of the present invention the vacuum reservoir 54 is located in the top member 44 of the frame 22. This reservoir 54 provides extra capacity of vacuum and additional hold time in case the vacuum pump 26 shuts down.

The fuel tank 56 of the preferred embodiment of the present invention is located in the side section 46 closest to the drive engine 24. Likewise the hydraulic fluid reservoir 58 is located in the side section 48 closest to the hydraulic pump 28. It is beneficial to locate the hydraulic fluid reservoir 58 higher than the hydraulic pump 28. This provides head pressure on the inlet of the hydraulic pump 28 and insures the hydraulic pump 28 is primed when it is engaged. In the preferred embodiment of the present invention the base section 50 is comprised of three individual hollow beams 60. One or more of these beams 60 can be used as a hydraulic fluid heat exchanger 62 used to cool the hydraulic fluid. The efficiency of this heat exchanger 61 can be increased by placing baffles (not shown) on the interior of the beams to increase the dwell time of the fluid in the heat exchanger 62 and increase the mixing of the fluid as it is cooled.

In the preferred embodiment the fluid and the hydraulic fluid starts by filling the hydraulic fluid reservoir 58. It then flows down through the hydraulic fluid heat exchanger 62 and into the hydraulic pump inlet 64. The fluid is pumped to a higher pressure and exits the pump through the hydraulic pump outlet 66. It is then directed to a solenoid 68 which directs the flow of the hydraulic fluid to a hydraulic motor 70 used to operate the rotator 30.

Figure 7:
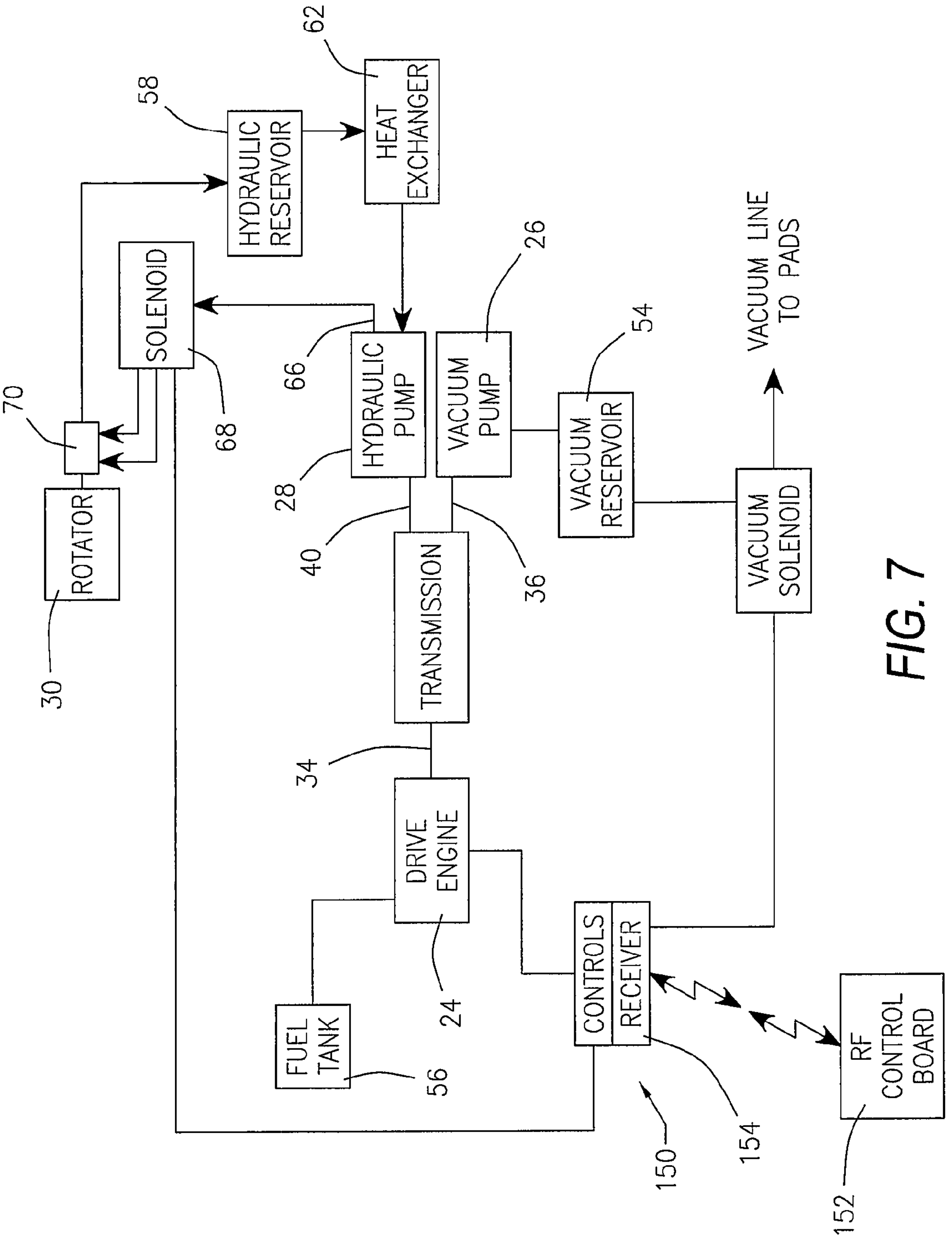
FIG. 7 is a schematic drawing on a second embodiment of the present invention.
Figure 8:
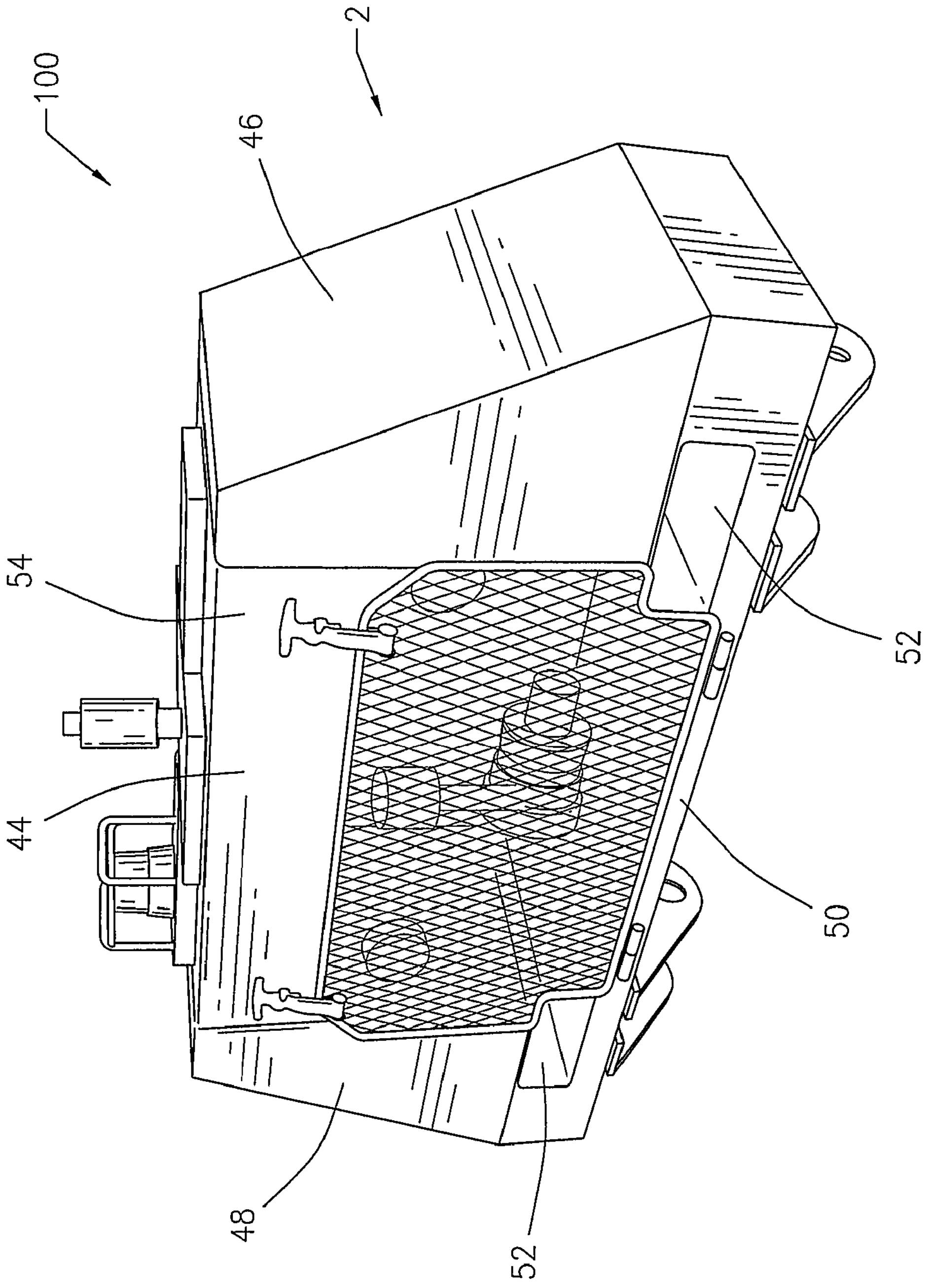
FIG. 8 is a perspective view of a third embodiment of the vacuum material handler of the present invention.
Figure 9:
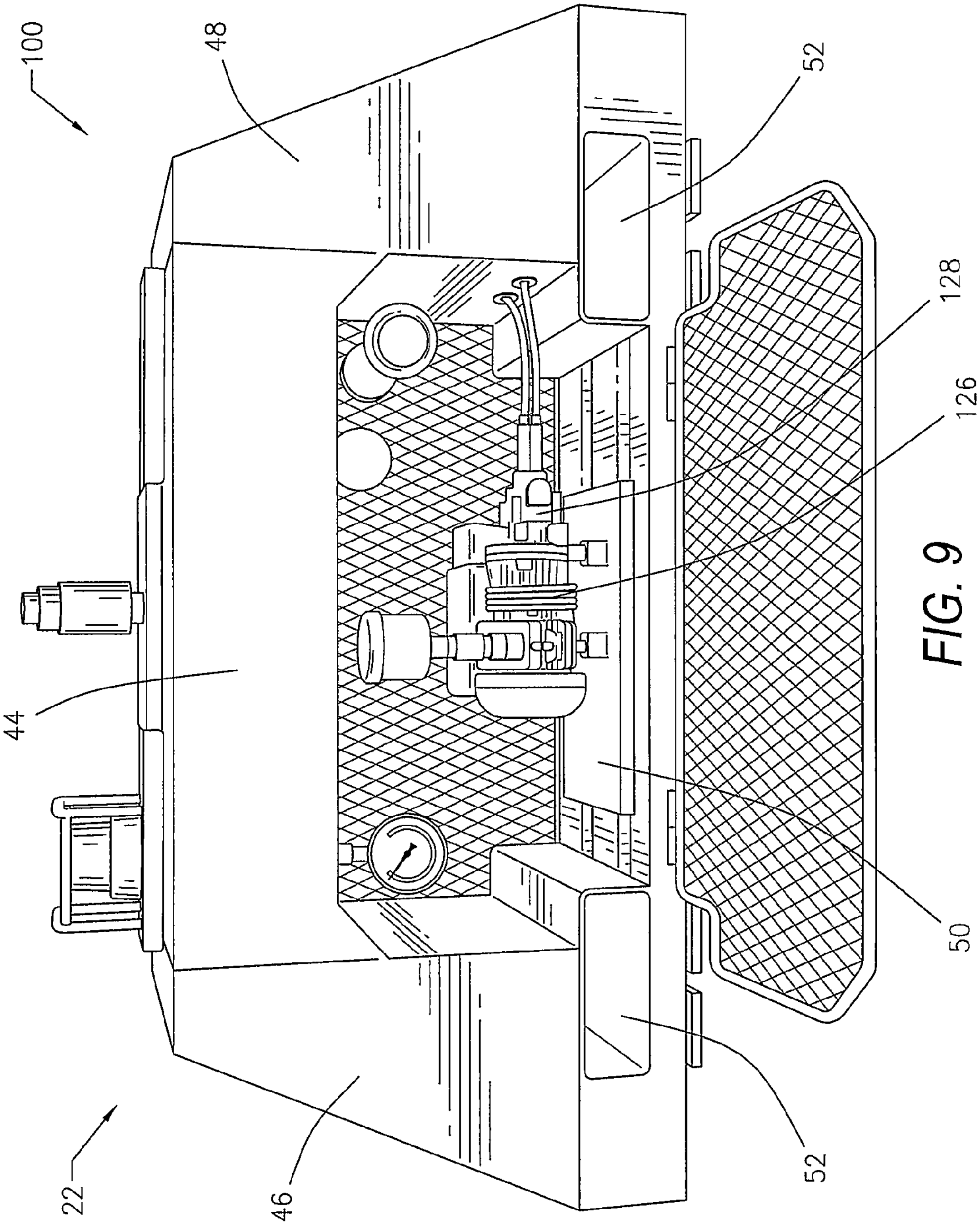
FIG. 9 is a front view of a third embodiment of the vacuum material handler of the present invention.
Figure 11:
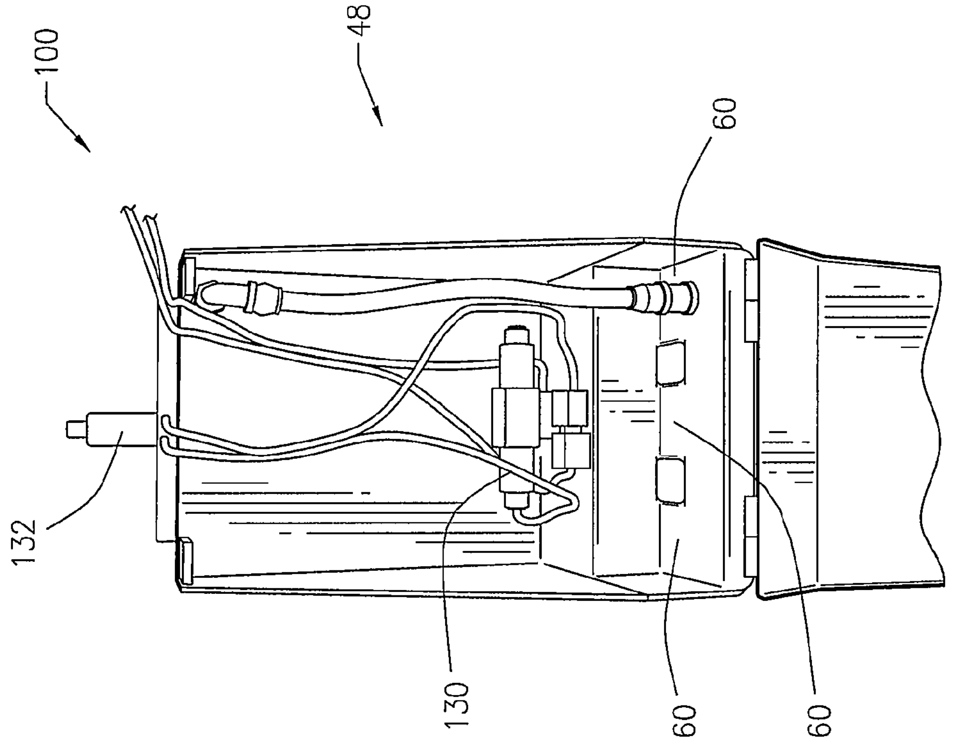
FIG. 11 is an interior view of the right side section of the third embodiment of the present invention.
Figure 10:
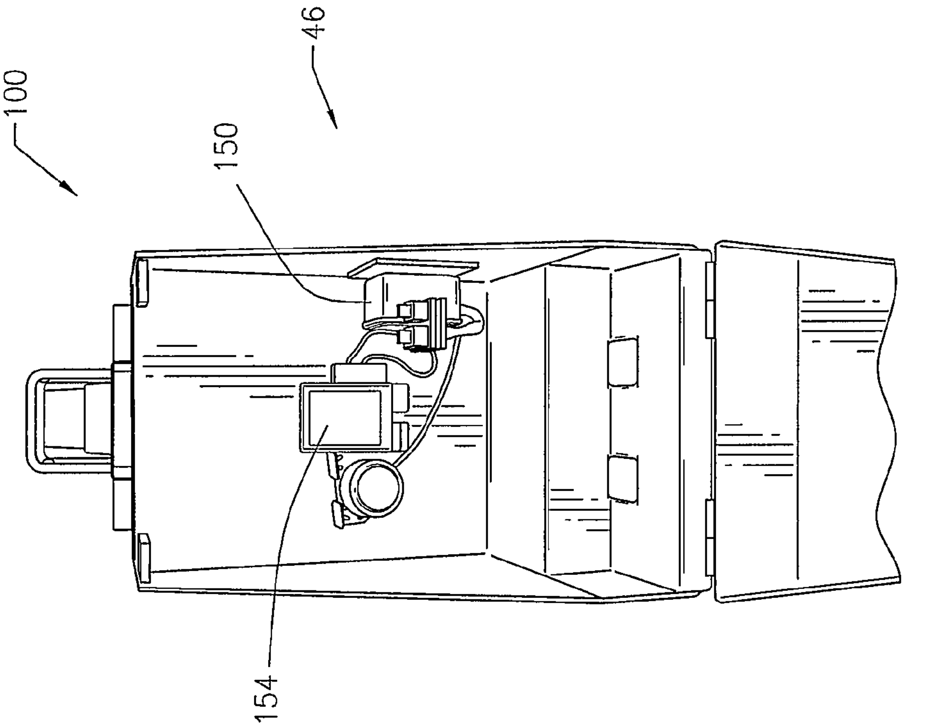
FIG. 10 is an interior view of the left side section of the third embodiment of the present invention.
Figure 12:
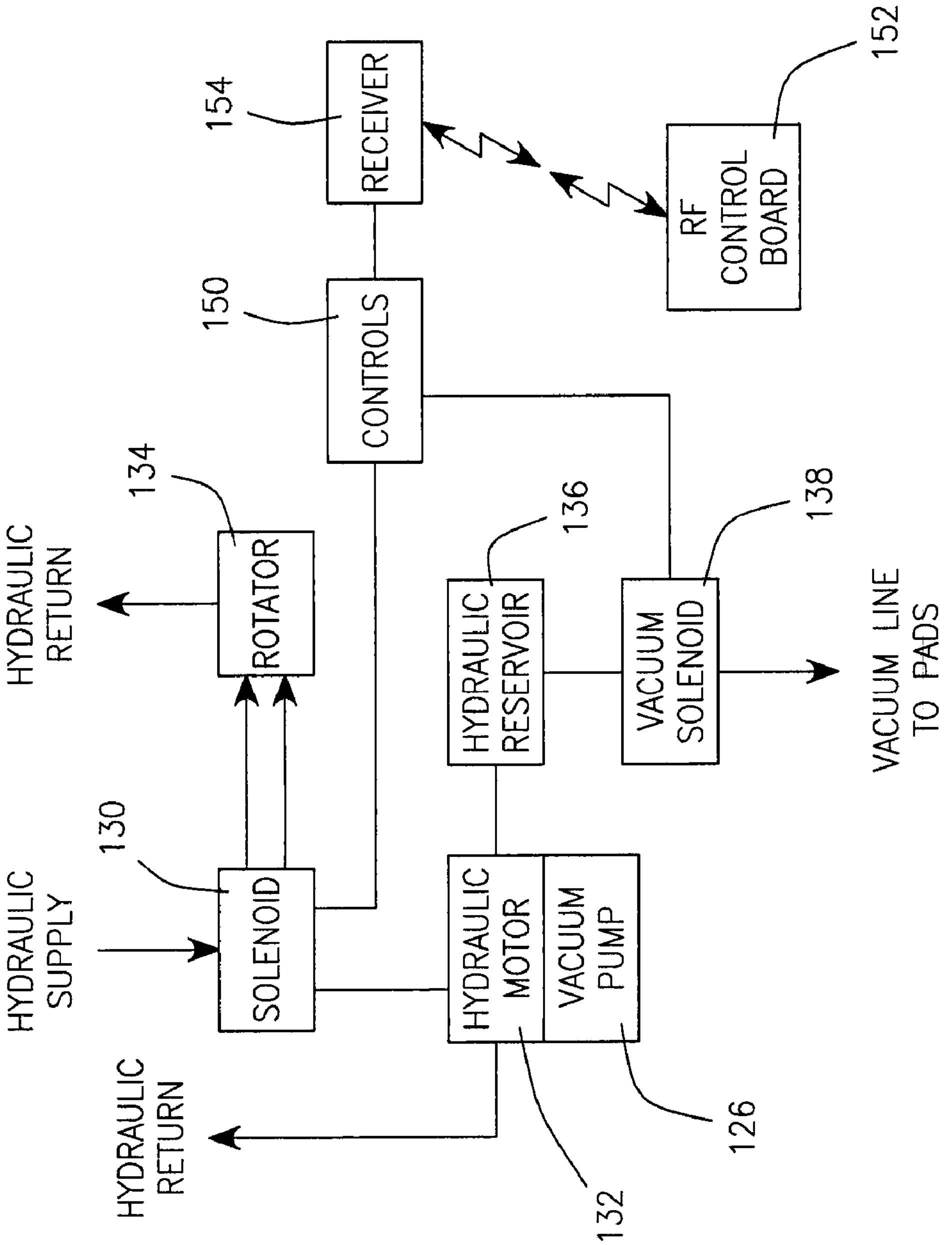
FIG. 12 is a schematic drawing of the third embodiment of the present invention.

Turning to FIG. 7, a second embodiment of the present invention involves using a transmission 72 to send power from the drive engine output shaft 34 to the vacuum pump input shaft 36 and hydraulic pump input shaft 40.

A third embodiment of the present invention is a vacuum material handler 100 powered by hydraulic fluid from the excavator E or other equipment on which it is mounted. See FIGS. 8 through 12. This embodiment utilizes the same frame 22 and frame components as described above. However this second embodiment does not use an onboard drive engine to power the vacuum pump. Also because the hydraulic power to operate the rotator 30 and vacuum pump 126 are supplied by the excavator or other equipment it is not necessary to mount a hydraulic reservoir, hydraulic cooling loop or hydraulic pump on the frame 22.

High pressure hydraulic fluid is supplied to a hydraulic solenoid 130 which controls the flow of hydraulic fluid to a hydraulic motor 132 driving the onboard vacuum pump 126. The hydraulic solenoid also controls the rotation of the material handler 100 by controlling the flow of hydraulic fluid to the rotator 132. Once the hydraulic fluid has been used by the hydraulic motor 132 or rotator 134 it is returned to the excavator E or other equipment via a return line.

The onboard vacuum pump 126 is in fluid communication with a vacuum reservoir 136. The vacuum solenoid 138 can be activated to put the pads 32 in fluid communication with the vacuum reservoir 136 and lift a pipe P or other material.

In any of the embodiments of the present invention the controls 150 used to operate the device may include radio frequency (RF) remote controls. This includes having a remote unit 152 that can be placed near the operator of the equipment. The remote unit 152 communicates wirelessly with a receiver 154 on the controls 150. The controls then operate the vacuum material handler 20, 100, through the operation of solenoids and sensors.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A vacuum material handler comprising:

a frame;

an onboard drive engine mounted on said frame;

an onboard vacuum pump mounted on said frame;

an onboard hydraulic pump mounted on said frame;

a hydraulic rotator mounted on said frame and powered by said hydraulic pump; and a transmission having an input shaft, a first output shaft and a second output shaft;

wherein said hydraulic rotator is capable of rotating said frame relative to a support for the frame and said input shaft is coupled to an engine output shaft, said first output shaft is coupled to a vacuum pump input shaft and said second output shaft is coupled to a hydraulic pump input shaft.

2. The device according to claim 1, said engine comprising an internal combustion engine.

3. The device according to claim 2, said internal combustion engine comprising a diesel engine.

4. The device according to claim 2, said internal combustion engine comprising a gasoline engine.

5. The device according to claim 1, further comprising an hydraulic fluid reservoir in fluid communication with said hydraulic pump, wherein said reservoir is mounted on said frame a level above said hydraulic pump.

6. The device according to claim 1, further comprising a hydraulic fluid cooling loop integrated into said frame.

7. The device according to claim 6, said frame further comprising at least one base member extending across said frame, said base member having one or more passageways in fluid communication with said cooling loop.

8. The device according to claim 7, further comprising one or more baffles located in said one or more passageway.

9. A vacuum material handler comprising:

a frame;

an onboard drive engine mounted on said frame;

an onboard vacuum pump mounted on said frame;

an onboard hydraulic pump mounted on said frame;

a hydraulic rotator mounted on said frame and powered by said hydraulic pump; and said frame comprising a pair of fork lift lugs;

wherein said hydraulic rotator is capable of rotating said frame relative to a support for the frame.

10. A vacuum material handler comprising:

a frame;

an onboard drive engine mounted on said frame;

an onboard vacuum pump mounted on said frame;

an onboard hydraulic pump mounted on said frame;

a hydraulic rotator mounted on said frame and powered by said hydraulic pump; and a duct to direct cooling air from said Onboard drive engine to said vacuum pump;

wherein said hydraulic rotator is capable of rotating said frame relative to a support for the frame.

11. A vacuum material handler comprising:

a frame;

an onboard drive engine mounted on said frame;

an onboard vacuum pump mounted on said frame;

an onboard hydraulic pump mounted on said frame;

a hydraulic rotator mounted on said frame and powered by said hydraulic pump; and a duct to direct cooling air from said Onboard drive engine to said onboard hydraulic pump;

wherein said hydraulic rotator is capable of rotating said frame relative to a support for the frame.

* * * * *